United States Patent [19]

Takemoto et al.

[11] Patent Number: 5,703,412
[45] Date of Patent: Dec. 30, 1997

[54] ENERGY RESERVOIR PROTECTION APPARATUS IN VEHICLE OCCUPANT PROTECTION SYSTEM

[75] Inventors: Norikazu Takemoto; Hideki Ishizuka; Takeshi Konta; Kunihiro Takeuchi, all of Tomioka, Japan

[73] Assignee: Airbag Systems Co., Ltd., Gunma, Japan

[21] Appl. No.: 740,068

[22] Filed: Oct. 24, 1996

[30] Foreign Application Priority Data

Oct. 30, 1995 [JP] Japan .................................. 7-303305

[51] Int. Cl.$^6$ ........................................................ B60L 3/00
[52] U.S. Cl. ............................ 307/10.1; 180/271; 307/64
[58] Field of Search ................................. 307/10.1, 121, 307/9.1, 43, 64–66; 280/734, 735; 180/282, 271; 340/436, 438, 669; 364/424.055; 320/1, 43, 48; 361/91

[56] References Cited

U.S. PATENT DOCUMENTS

| | | | |
|---|---|---|---|
| 3,753,001 | 8/1973 | Hiroshima et al. | 307/10.1 |
| 5,187,382 | 2/1993 | Kondo | 307/10.1 |

*Primary Examiner*—Richard T. Elms
*Attorney, Agent, or Firm*—Wenderoth, Lind & Ponack

[57] ABSTRACT

In the apparatus, a CPU 5 receives through its first and second I/O terminals a pair of voltages proportional to a terminal voltage of an electrolytic capacitor 4 serving as an energy reservoir, and a voltage proportional to an output voltage of a booster circuit 1. When the terminal voltage of the electrolytic capacitor 4 exceeds its breakdown voltage, a transistor 9 conducts, which permits the electrolytic capacitor 4 to discharge, whereby the over-voltage condition of the electrolytic capacitor 4 is resolved.

8 Claims, 2 Drawing Sheets

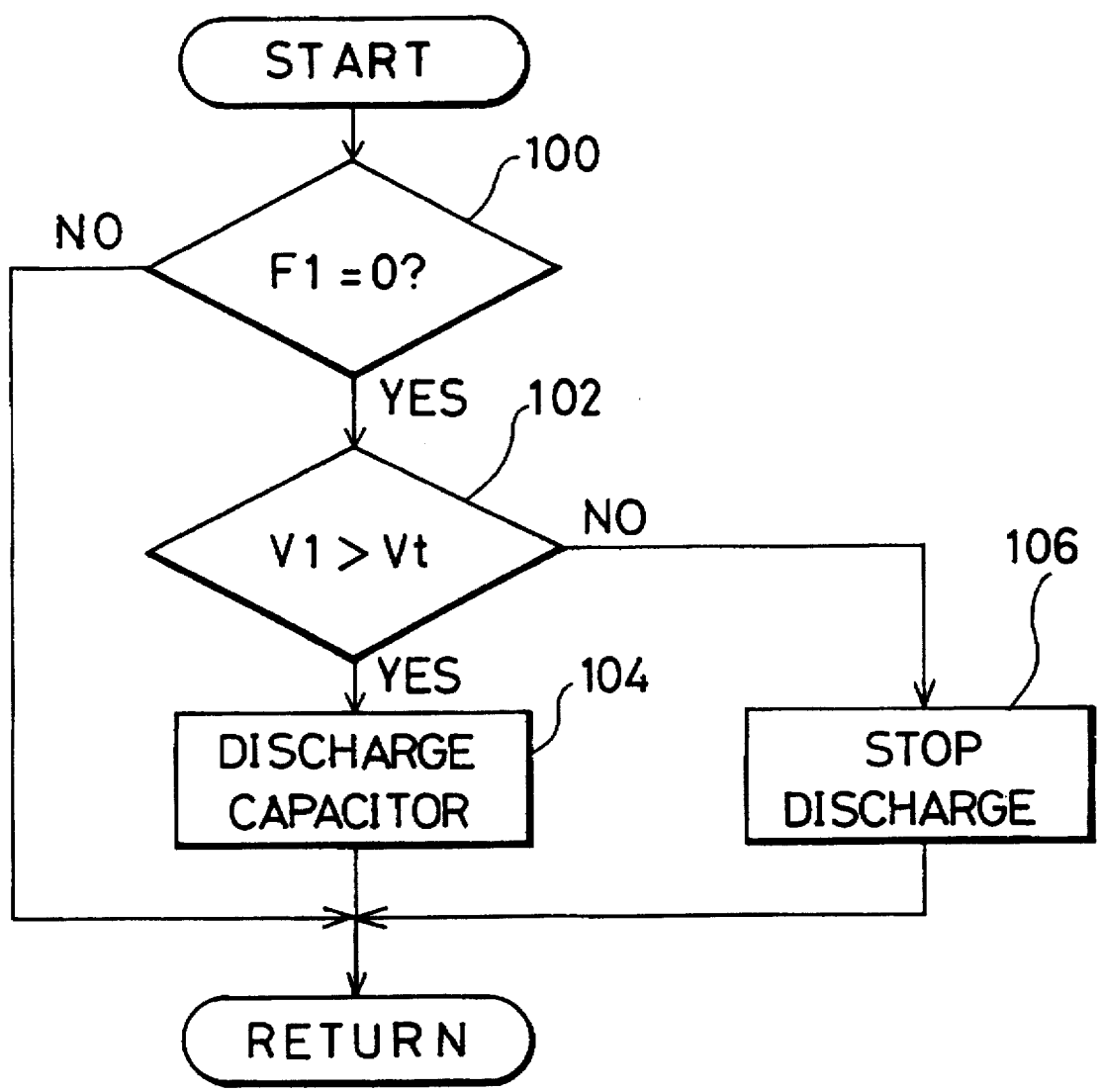

5,703,412

ENERGY RESERVOIR PROTECTION APPARATUS IN VEHICLE OCCUPANT PROTECTION SYSTEM

BACKGROUND OF THE INVENTION

1. Field of the Invention

The present invention relates to a protection apparatus of an electrolytic capacitor, which capacitor is a so-called energy reservoir provided in a vehicle occupant protection system typified by air bag systems and serves as an emergency electric power source. More particularly, the present invention relates to an energy reservoir protection apparatus used in a vehicle occupant protection system, which energy reservoir protection apparatus is improved in protection against over-charge.

2. Description of the Related Art

In a vehicle occupant protection system typified by air bag systems and the like, a unit called "Electrical Control Unit" (hereinafter referred to as the ECU) serves as an essential component for controlling the system in operation. Upon consideration of an important role of the vehicle occupant protection system in emergency, in most cases, the ECU is provided with an electrolytic capacitor called the energy reservoir, which serves as a so-called backup power source for keeping the supply voltage at a predetermined value to ensure that the vehicle occupant protection system normally operates without fail even when the power supply line is accidentally cut due to crash accident of a vehicle carrying the above system. As described above, in emergency, the electrolytic capacitor begins to supply the electric power to individual components provided inside the ECU, which ensures the normal operation of the vehicle occupant protection system in emergency.

Consequently, the deterioration of the electrolytic capacitor prevents such vehicle occupant protection system from normally functioning, and, therefore has a direct influence on the safety of the vehicle occupants. Consequently, it is absolutely necessary to ensure that the electrolytic capacitor normally functions at any time in the system.

For the above reasons, a number of diagnosis equipments of the electrolytic capacitor have been developed for making the diagnosis of the electrolytic capacitor on its capacitance and charged voltage through an appropriate process, for example, by discharging the capacitor for a predetermined period of time by means of a suitable switching device such as transistors and like switching devices (see Japanese Patent Laid-Open No. Hei 6-331669).

However, in any one of the conventional diagnosis equipments mentioned above, there is a fear that the electrolytic capacitor is subjected to its breakdown voltage at worst, because the conventional diagnosis equipments merely show abnormal conditions in voltage and capacitance of the electrolytic capacitor to the user, i.e., they have no means for positively correcting the failure of a booster circuit through which the voltage of a battery is increased to a predetermined value required in the ECU, and because they have no means for positively resolving the over-voltage conditions of the electrolytic capacitor caused by a so-called damped surge and like phenomena.

SUMMARY OF THE INVENTION

It is an object of the present invention to provide an energy reservoir protection apparatus in a vehicle occupant protection system, which apparatus may detect an over-voltage condition of an electrolytic capacitor serving as an energy reservoir in the ECU, and may positively resolve such over-voltage condition.

It is another object of the present invention to provide an energy reservoir protection apparatus in a vehicle occupant protection system, which apparatus is substantially constructed of the existent circuit components or devices of the ECU, substantially without using any additional component or device to protect the electrolytic capacitor against over-voltage.

It is further another object of the present invention to provide an energy reservoir protection apparatus in a vehicle occupant protection system, which apparatus may be sophisticated in function by the use of software, substantially without using any additional hardware.

According to a first aspect of the present invention, the above objects of the present invention are accomplished by providing:

In an energy reservoir protection apparatus in a vehicle occupant protection system, the apparatus being provided with a capacitance diagnosis circuit for making the diagnosis in capacitance of an electrolytic capacitor, the capacitance diagnosis circuit having a booster circuit through which an output voltage of a battery is increased to a predetermined value and issued therefrom, the booster circuit having its output side connected with the electrolytic capacitor, the capacitance diagnosis circuit being provided with a discharge means for permitting, if necessary, the electrolytic capacitor to discharge in the diagnosis in capacitor of the electrolytic capacitor; the improvement wherein the energy reservoir protection apparatus comprises:

an over-voltage judgment means for judging as to whether or not a terminal voltage of the electrolytic capacitor exceeds its breakdown voltage; and a forced-discharge control means for having the discharge means of the capacitance diagnosis circuit operated for a predetermined period of time so that the electrolytic capacitor is forced to discharge when the over-voltage judgment means judges the terminal voltage of the electrolytic capacitor to be above the breakdown voltage;

whereby the over-voltage condition of the electrolytic capacitor is resolved.

According to a second aspect of the present invention, the above objects of the present invention are accomplished by providing:

The energy reservoir protection apparatus in the vehicle occupant protection system, as set forth in the first aspect of the present invention, wherein:

the forced-discharge control means has the discharge means operated until the over-voltage judgment means judges the terminal voltage of the electrolytic capacitor to be below the breakdown voltage.

According to a third aspect of the present invention, the above objects of the present invention are accomplished by providing:

The energy reservoir protection apparatus in the vehicle occupant protection system, as set forth in the first aspect of the present invention, wherein:

the discharge means is constructed of a transistor; and the transistor has its collector connected with one of opposite terminals of the electrolytic capacitor, its emitter connected with the other of the opposite terminals of the electrolytic capacitor, and its base connected with a CPU to receive a control signal issued from the CPU, the control signal causing the transistor to conduct.

According to a fourth aspect of the present invention, the above objects of the present invention are accomplished by providing:

The energy reservoir protection apparatus in the vehicle occupant protection system, as set forth in the first aspect of the present invention, wherein:

the over-voltage judgment means compares a first voltage with a predetermined reference voltage to judge as to whether or not the terminal voltage of the electrolytic capacitor exceeds its breakdown voltage, the first voltage being obtained through resistive-type voltage dividing of a voltage developed across the electrolytic capacitor.

In the above construction of the present invention, the discharge means, which is provided so as to constitute the capacitance diagnosis circuit, also functions to resolve the over-voltage condition of the electrolytic capacitor serving as the energy reservoir.

In other words, when the over-voltage judgment means judges that the electrolytic capacitor is subjected to its breakdown voltage, the forced-discharge control means forcibly operates the discharge means constituting the capacitance diagnosis circuit, so that the electrolytic capacitor is put in its discharge condition to resolve its over-voltage condition.

BRIEF DESCRIPTION OF THE DRAWINGS

FIG. 2 is a flowchart of a subroutine for resolving the over-voltage condition of the electrolytic capacitor, illustrating the process, i.e., procedures or processing steps of the subroutine executed by the CPU.

DESCRIPTION OF THE PREFERRED EMBODIMENTS

Figure 1:
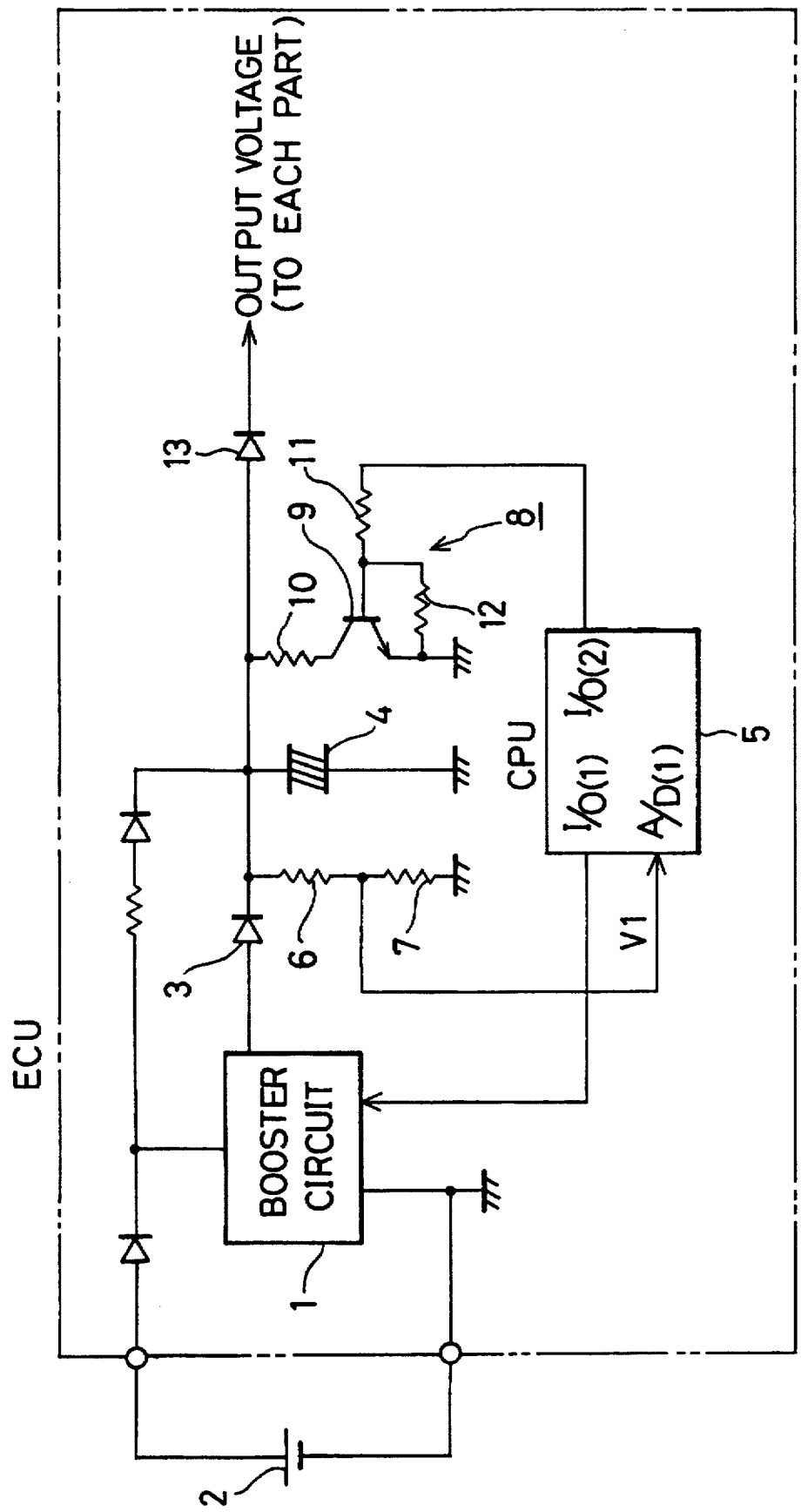
FIG. 1 is a circuit diagram of the energy reservoir protection apparatus in the vehicle occupant protection system according to an embodiment of the present invention.

Hereinbelow, the present invention will be described in detail with reference to the accompanying drawings which illustrate an embodiment of the present invention.

Incidentally, any of parts and arrangements appearing in the following description of the present invention is not limited to that of the embodiment of the present invention shown in the drawings since many changes and modifications can be made thereto without departing from the spirit of the present invention.

First, in construction, generally speaking, in an energy reservoir protection apparatus in a vehicle occupant protection system according to the present invention: a capacitance diagnosis circuit makes a capacitance diagnosis of an electrolytic capacitor which serves as an energy reservoir functioning to supply an electric power source voltage, i.e., line voltage in emergency; and, the capacitance diagnosis circuit is provided inside an electrical control unit (hereinafter referred to as the ECU) which is an essential part of the vehicle occupant protection system. Based on the above premises, the energy reservoir protection apparatus in the vehicle occupant protection system according to the embodiment of the present invention is substantially realized by a central processing unit (i.e., CPU) through the execution of a predetermined program or process, the CPU being provided in the ECU.

Referring now to the concrete construction of the embodiment of the present invention shown in FIG. 1, a booster circuit 1 increases the voltage of a battery 2 to a predetermined voltage supplied to individual components or devices of the ECU. The booster circuit 1 is constructed of, for example, a DC—DC converter having a conventional circuit in construction. The booster circuit 1 has its output side connected with one of opposite terminals of an electrolytic capacitor 4 through a protective diode 3. The electrolytic capacitor 4 serves as an energy reservoir. As is clear from FIG. 1, the other terminal of the electrolytic capacitor 4 is grounded. Incidentally, the protective diode 3 functions to prevent current from reverse flowing from the electrolytic capacitor 4 into the booster circuit 1.

Further, the booster circuit 1 is controlled by a central processing unit (i.e., CPU) 5 which stops and starts the operation of the booster circuit 1. Namely, the CPU 5 has its first input/output terminal (i.e., I/O (1) shown in FIG. 1, hereinafter referred to as the first I/O terminal) connected with the booster circuit 1 to issue a control signal thereto, as shown in FIG. 1.

Connected in parallel with the electrolytic capacitor 4 are a pair of resistors 6, 7 connected in series. A junction between these resistors 6, 7 is connected with a first analog-to-digital converter input terminal (i.e., A/D (1) shown in FIG. 1, hereinafter referred to as the first A/D terminal) of the CPU 5, which constitutes an essential part of the ECU in control operation, so that a voltage developed at this junction is translated into a digital readout in the CPU 5, which enables the CPU 5 to monitor a charging voltage of the electrolytic capacitor 4 so as to make the capacitance diagnosis of the capacitor 4.

Incidentally, in the embodiment of the present invention, the voltage developed at the junction between the resistors 6, 7, which voltage is read out for making in essence the capacitance diagnosis of the electrolytic capacitor 4, is used as data for monitoring the over-voltage of the electrolytic capacitor 4, as described later.

As shown in FIG. 1, a discharge circuit 8 is disposed between an upper terminal of the electrolytic capacitor 4 and the ground. This upper terminal of the electrolytic capacitor 4 is connected with the cathode of a protective diode 3.

In essence, the discharge circuit 8 is provided for the purpose of discharging in the capacitance diagnosis of the electrolytic capacitor 4. In the discharge circuit 8 of the embodiment of the present invention, an npn transistor 9 has its collector connected with the upper terminal of the electrolytic capacitor 4 through a resistor 10, its emitter connected with the ground, and its base connected with a second input/output terminal (i.e., I/O (2) shown in FIG. 1, hereinafter referred to as the second I/O terminal) of the CPU 5 through a resistor 11 and further connected with the ground through a resistor 12.

In essence, the CPU 5 is provided for the purpose of executing a main routine for controlling the vehicle occupant protection system in operation. In the present invention, the CPU 5 imparts its ability to the capacitance diagnosis of the electrolytic capacitor 4, and, therefore constitutes an essential part of the capacitance diagnosis circuit. Namely, in the capacitance diagnosis of the electrolytic capacitor 4 made by the CPU 5, the program or process is executed so that: if necessary, the discharge circuit 8 described above is operated; and, base on a voltage corresponding to a terminal voltage of the electrolytic capacitor 4 inputted to the CPU 5 through the first A/D terminal thereof, the CPU 5 makes the capacitance diagnosis of the electrolytic capacitor 4.

Now, referring to FIG. 2, there is shown a flowchart illustrating a series of processing procedures for protecting the electrolytic capacitor 4 against over-voltage, which procedures are executed by the CPU 5. The flowchart shown in FIG. 2 represents a series of processing procedures executed as a subroutine in the main routine which is executed by the CPU 5 for controlling the operation of the ECU.

As is clear from the flowchart of FIG. 2, in a step 100, it is judged or decided whether an A/D detected trouble flag F1 is "0 (i.e., zero)" or not. In the main routine (not shown), when any one of power-supplied circuits to which the booster circuit 1 supplies the electric power is judged to be in trouble under predetermined conditions, the flag F1 is set to "1". On the other hand, when such power-supplied circuit is judged to be free from any trouble, the flag F1 is set to "0 (i.e., zero)"

In case that the flag F1 is set to "1" (i.e., F1=1) in the step 100, the power-supplied circuit is already judged to be in trouble, and, therefore the operation of the booster circuit 1 is stopped. Consequently, as is clear from the flowchart shown in FIG. 2, the process goes to a step "RETURN", i.e., returns to the main routine (not shown).

On the other hand, when the flag F1 is set to "0" (i.e., in case that the process goes to a flow line "YES" subsequent to the step 100), in other words, in case that the power-supplied circuit is judged to be free from any trouble, the process goes to a step 102 subsequent to the step 100. In the step 102, it is judged as to whether or not a voltage V1 inputted to the first A/D terminal of the CPU 5 exceeds a predetermined voltage Vt, as shown in FIG. 2.

The voltage V1 is proportional to the terminal voltage of the electrolytic capacitor 4, and, therefore obtained by resistance-type voltage dividing of the terminal voltage of the electrolytic capacitor 4 by means of the resistors 6, 7 forming a resistive voltage divider. On the other hand, the predetermined voltage Vt is proportional to the breakdown voltage of the electrolytic capacitor 4, and, therefore obtained in the substantially same manner as that of the voltage V1, i.e., obtained by resistance-type voltage dividing of the breakdown voltage of the electrolytic capacitor 4 by means of the resistors 6, 7, which form the same resistive voltage divider as that of the above.

Consequently, in this step 102, it is substantially judged as to whether or not a voltage charged in the electrolytic capacitor 4 exceeds the breakdown voltage of the electrolytic capacitor 4.

When the voltage V1 is judged to be above the predetermined voltage Vt (i.e., in case that the process goes to a flow line "YES" subsequent to the step 102), a transistor 9 is judged to be in its conductive condition, so that the electrolytic capacitor 4 is forcibly discharged in a step 104 subsequent to the step 102, whereby the over-voltage condition, in which the electrolytic capacitor 4 is subjected to a voltage exceeding its breakdown voltage, is positively resolved.

On the other hand, in the previous step 102, When the voltage of the electrolytic capacitor 4 is judged to be below its breakdown voltage (i.e., the process goes to a flow line "NO" subsequent to the step 102), a voltage charged in the electrolytic capacitor 4 is judged to be a normal level, so that the electrolytic capacitor 4 stops its discharge in a step 106 subsequent to the step 102. Namely, in case that the electrolytic capacitor 4 has been put in its discharge condition in the previous process, the CPU 5 stops issuance of a control signal outputted from the second I/O terminal thereof so that the transistor 9 is put in its conductive condition, whereby the discharge of the electrolytic capacitor 4 ceases.

After completion of the step 104 as described in the above, the process returns to its main routine (not shown) executed by the CPU 5. Then, after the elapse of a predetermined period of time (for example, about 100 milliseconds), the process illustrated in FIG. 2 is repeated, which ensures that the electrolytic capacitor 4 is prevented from being damaged by over-voltage.

Incidentally, the A/D detected trouble flag F1 is reset at a time when the trouble in the power-supplied circuit is resolved so that the CPU 5 is reset as a whole.

In the above embodiment of the present invention: the discharge means is embodied in the discharge circuit 8; the over-voltage judgment means is embodied in the execution of the step 102 by means of the CPU 5 in the flowchart shown in FIG. 2; and, the forced-discharge control means is embodied in the execution of the step 104 by means of the CPU 5 in the flowchart shown in FIG. 2.

As described above, the present invention is so constructed as to positively resolve the over-voltage condition of the electrolytic capacitor 4 which is used for the purpose of providing a backup power source called the energy reservoir in the power source circuit of the vehicle occupant protection system. Consequently, when the electrolytic capacitor is in its over-voltage condition, since the discharge means forms the capacitance diagnosis circuit provided in the vehicle occupant protection system and enables the electrolytic capacitor to discharge, it is possible for the present invention to positively resolve the over-voltage condition of the electrolytic capacitor by means of a simple construction substantially constructed of the existent circuit components or devices.

Further, in the present invention, since the electrolytic capacitor is positively prevented from falling in its over-voltage condition, it is possible for the present invention to protect the electrolytic capacitor against any damage caused by over-voltage and also against any of its secondary accidents, which may improve the apparatus of the present invention in safety.

Further, in the present invention, since there is substantially no necessity of adding new circuit components or devices, it is possible to apply the present invention to the existent apparatus, which may considerably reduce the manufacturing cost of the apparatus of the present invention.

What is claimed is:

1. In an energy reservoir protection apparatus in a vehicle occupant protection system, said apparatus being provided with a capacitance diagnosis circuit for making the diagnosis in capacitance of an electrolytic capacitor, said capacitance diagnosis circuit having a booster circuit through which an output voltage of a battery is increased to a predetermined value and issued therefrom, said booster circuit having its output side connected with said electrolytic capacitor, said capacitance diagnosis circuit being provided with a discharge means for permitting, if necessary, said electrolytic capacitor to discharge in said diagnosis in capacitor of said electrolytic capacitor; the improvement wherein said energy reservoir protection apparatus comprises:

an over-voltage judgment means for judging as to whether or not a terminal voltage of said electrolytic capacitor exceeds its breakdown voltage; and a forced-discharge control means for having said discharge means of said capacitance diagnosis circuit operated for a predetermined period of time so that said electrolytic capacitor is forced to discharge when said over-voltage judgment means judges said terminal voltage of said electrolytic capacitor to be above said breakdown voltage;

whereby the over-voltage condition of said electrolytic capacitor is resolved.

2. The energy reservoir protection apparatus in the vehicle occupant protection system, as set forth in claim 1, wherein: said forced-discharge control means has said discharge means operated until said over-voltage judgment means judges said terminal voltage of said electrolytic capacitor to be below said breakdown voltage.

3. The energy reservoir protection apparatus in the vehicle occupant protection system, as set forth in claim 1, wherein:

said discharge means is constructed of a transistor; and said transistor has its collector connected with one of opposite terminals of said electrolytic capacitor, its emitter connected with the other of said opposite terminals of said electrolytic capacitor, and its base connected with a CPU to receive a control signal issued from said CPU, said control signal causing said transistor to conduct.

4. The energy reservoir protection apparatus in the vehicle occupant protection system, as set forth in claim 2, wherein:

said discharge means is constructed of a transistor; and said transistor has its collector connected with one of opposite terminals of said electrolytic capacitor, its emitter connected with the other of said opposite terminals of said electrolytic capacitor, and its base connected with a CPU to receive a control signal issued from said CPU, said control signal causing said transistor to conduct.

5. The energy reservoir protection apparatus in the vehicle occupant protection system, as set forth in claim 1, wherein:

said over-voltage judgment means compares a first voltage with a predetermined reference voltage to judge as to whether or not said terminal voltage of said electrolytic capacitor exceeds its breakdown voltage, said first voltage being obtained through resistive-type voltage dividing of a voltage developed across said electrolytic capacitor.

6. The energy reservoir protection apparatus in the vehicle occupant protection system, as set forth in claim 2, wherein:

said over-voltage judgment means compares a first voltage with a predetermined reference voltage to judge as to whether or not said terminal voltage of said electrolytic capacitor exceeds its breakdown voltage, said first voltage being obtained through resistive-type voltage dividing of a voltage developed across said electrolytic capacitor.

7. The energy reservoir protection apparatus in the vehicle occupant protection system, as set forth in claim 3, wherein:

said over-voltage judgment means compares a first voltage with a predetermined reference voltage to judge as to whether or not said terminal voltage of said electrolytic capacitor exceeds its breakdown voltage, said first voltage being obtained through resistive-type voltage dividing of a voltage developed across said electrolytic capacitor.

8. The energy reservoir protection apparatus in the vehicle occupant protection system, as set forth in claim 4, wherein:

said over-voltage judgment means compares a first voltage with a predetermined reference voltage to judge as to whether or not said terminal voltage of said electrolytic capacitor exceeds its breakdown voltage, said first voltage being obtained through resistive-type voltage dividing of a voltage developed across said electrolytic capacitor.

* * * * *